L. W. MEYER.
TIRE PUMP.
APPLICATION FILED NOV. 12, 1918.
1,326,764.
Patented Dec. 30, 1919.
2 SHEETS—SHEET 1.
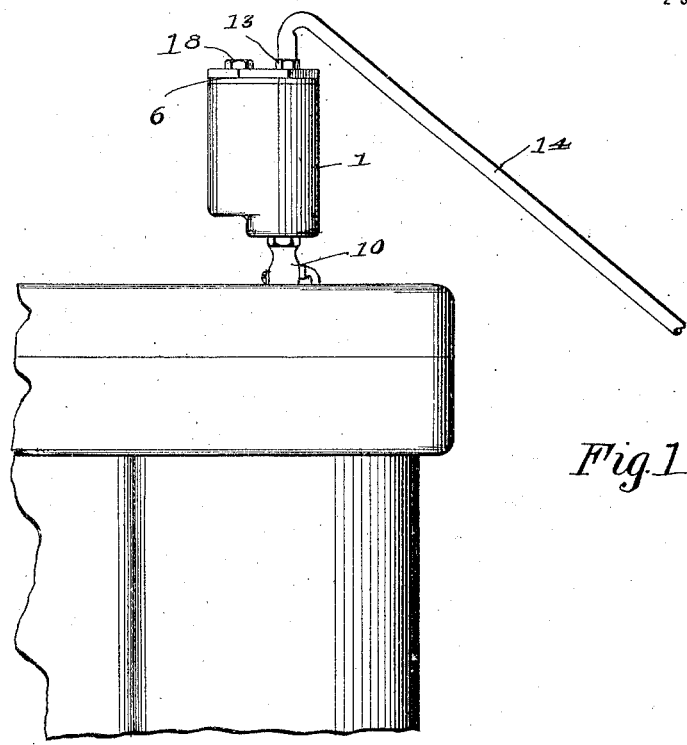
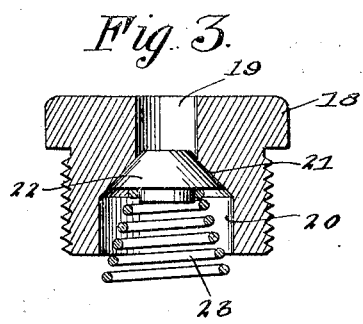
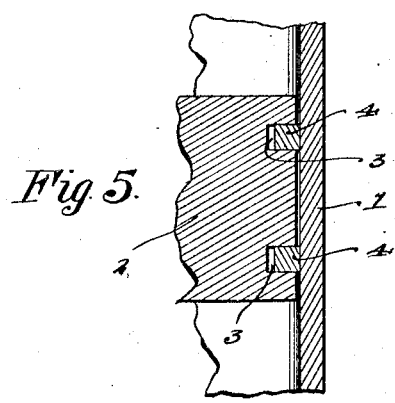
Witnesses
R. A. Thomas
J. J. McCarthy
Inventor
Louis W. Meyer
By Victor J. Evans
Attorney L. W. MEYER.
TIRE PUMP.
APPLICATION FILED NOV. 12, 1918.
1,326,764.
Patented Dec. 30, 1919.
2 SHEETS—SHEET 2.
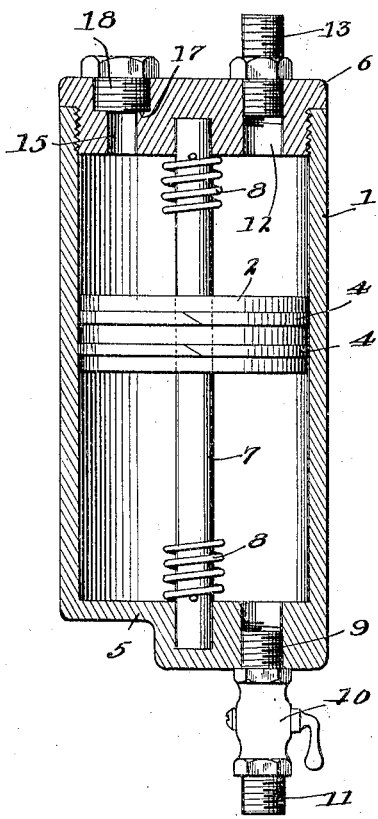
Fig. 2.
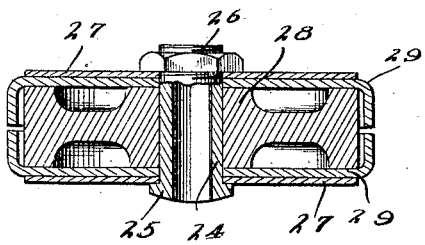
Fig. 6.
Fig. 7.
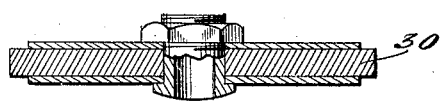
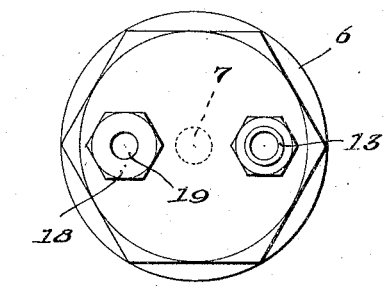
Fig. 4.
Witnesses
H. A. Thomas
J. J. McCarthy
Inventor
Louis W. Meyer.
By Victor J. Evans
Attorney

UNITED STATES PATENT OFFICE.

LOUIS WALTER MEYER, OF CHICAGO, ILLINOIS.

TIRE-PUMP.

1,326,764.   Specification of Letters Patent.   Patented Dec. 30, 1919.

Application filed November 12, 1918. Serial No. 262,204.

*To all whom it may concern:*

Be it known that I, LOUIS W. MEYER, a citizen of the United States, residing at Chicago, in the county of Cook and State of Illinois, have invented new and useful Improvements in Tire-Pumps, of which the following is a specification.

This invention relates to improvements in tire pumps for motor vehicles and has particular application to a fluid operated pump.

In carrying out the present invention it is my purpose to provide a fluid operated pump for the tires of motor vehicles which may be connected directly with one of the cylinders of an internal combustion engine either at the spark plug opening, the pet cock opening or which may be inserted in an opening formed in the cylinder particularly to accommodate the pump, and which will be constructed in such manner that the reciprocatory motion of the piston in the engine cylinder shall be transmitted to the pump piston through the fluid or gas in the engine cylinder, thereby enabling the pump piston to be operated to deliver air to the tire.

It is also my purpose to provide a pump of the class described which will embrace the desired features of simplicity, efficiency and durability, which may be manufactured and marketed at small cost, and which may be conveniently handled and carried about.

With the above recited objects in view and others of a similar nature, the invention resides in the construction, combination and arrangement of parts hereinafter set forth in and falling within the scope of the appended claim.

In the accompanying drawing:—

Figure 1 is a fragmentary side elevation of an engine cylinder showing my improved pump applied thereto connected by means of a flexible hose to the tire.

Fig. 2 is an enlarged vertical sectional view through the pump removed from the engine cylinder.

Fig. 3 is an enlarged vertical sectional view through the inlet valve of the pump.

Fig. 4 is a top plan view of the pump.

Fig. 5 is an enlarged fragmentary vertical sectional view through the piston.

Fig. 6 is a similar view showing a modified form of piston.

Fig. 7 is a like view of a further modified construction of piston.

Referring now to the drawings in detail 1 designates a cylinder in which is mounted for reciprocatory movement a piston 2. In the present instance the periphery of the piston 2 is formed with grooves 3 in which are disposed packing rings 4 respectively that engage the wall of the cylinder 1 to act to prevent leakage. One end of the cylinder 1 is closed by means of an integral end wall 5 while the other end of the cylinder is closed through the medium of a plug 6 that, in the present instance, is threaded into the cylinder. Arranged within the cylinder 1 centrally thereof is a rod 7 that extends through the piston 2 at the center of the latter and the connection between the piston 2 and the rod 7 is such that the piston may move freely upon the rod in the operation of the pump. Encircling the rod 7 adjacent to each end thereof are shock absorbing springs 8 that act to take the impact of the piston in its reciprocatory movement within the cylinder, thereby preventing the piston from striking the end walls of the cylinder while the pump is in use.

In the present instance a nipple 9 is threaded into the end wall 5 of the cylinder to one side of the center of the latter and connected with the outer end of the nipple 9 is a stop cock or valve 10. The outer extremity of the casing of the stop cock is equipped with a nipple 11 which is adapted to be threaded into the spark plug opening of the particular cylinder of the internal combustion engine, or into the pet cock opening of such cylinder, or the engine cylinder may be provided with a special opening for the reception of the nipple 11.

The plug 6 closing the other end of the cylinder 1 is formed with a passage 12 and threaded into the outer end of the passage 12 is a nipple 13. Connected with the outer extremity of the nipple 13 is one end of a flexible hose 14 the other end of which is adapted to engage the tire valve in the use of the pump so that the air may be delivered from the pump to the tire.

Also formed in the plug 6 is a port 15 having its outer end counter-sunk as at 17. Threaded into the counter-sunk portion of the port 15 is a valve casing 18 formed with a port 19 and an enlarged bore 20 inwardly of the port 19. At the junction of the port 19 and the enlarged bore 20 a valve seat 21 is formed and engaging the valve seat 21 is a valve 22 normally held in engagement with the seat by means of an expansion spring 23. The valve 22 in engagement with the seat 21 of the valve casing 18 constitutes the air inlet valve for the pump.

When my improved pump is in operation the spark plug of the particular cylinder is disconnected from the power wire and the air and gas or other fluid in the engine cylinder is delivered to and exhausted from the cylinder 1 at one side of the piston 2 thereby causing the piston 2 to reciprocate within the cylinder 1, the stop cock 10 being open, of course, when the pump is in operation. In the reciprocatory motion of the piston 2 of the pump incident to the corresponding motion of the piston in the engine cylinder, air is drawn into the outer end of the cylinder 1 through the port 19 past the valve 22 and is delivered, on the outward stroke of the piston, through the nipple 13 and the flexible hose 14 to the tire. In the operation of the pump the springs 8 act as shock absorbing elements so as to reduce the vibration of the various parts of the pump to eliminate any noise which might occur in the operation of the pump.

In Fig. 6 of the drawing I have shown a modified form of piston for use in connection with the cylinder 1 of the pump. In this case the piston comprises a sleeve 24 adapted to surround the guide rod 7 and having one end formed with a head 25 and the other end formed with threads 26. Surrounding the sleeve 24 are metal washers 27 and arranged between the washers 27 is a spacer 28, while interposed between the opposite sides of the spacer 28 and the washers 27 are leather washers 29 each of greater diameter than the diameters of the washers 27 and the spacer. The outer portion of the leather washers 29 extend toward each other as clearly shown in Fig. 6 of the drawing and engage the inner wall of the cylinder 1 so as to form a fluid tight joint between the piston and the wall of the cylinder.

In the construction shown in Fig. 7 of the drawings the leather washers 29 are dispensed with as is also the spacer 28 and in place of these elements I employ a relatively large leather disk 30 that is adapted to engage the side wall of the cylinder 1 when the piston is placed within the cylinder.

From the foregoing description taken in connection with the accompanying drawings, it will be seen that I have provided an air pump which may be quickly and conveniently attached to an engine cylinder so that the reciprocatory movement of the engine piston may be transferred to the pump piston thereby enabling the pump piston to be actuated to deliver air to the tire. It will also be seen that the guides 7 in the cylinder act to hold the piston in proper position at all times for sufficient operation, while the springs 8 act to cushion the piston as it reaches the end of its stroke, thereby reducing the transmission of shock to the various parts of the pump and assuring a smooth action.

If desired, the guide rod 7 may be dispensed with and other means employed to guide the piston in its movement and likewise, the valve 10 may be eliminated and a valveless tube or sleeve employed to connect the cylinder of the pump with the particular cylinder of the engine in which the pump is to be used.

I claim:—

In a pump of the class described, the combination of a cylinder having a bottom, a removable plug closing the opposite end thereof, a centrally disposed rod terminally connected with the opposite ends of the cylinder, a piston arranged to reciprocate upon said rod, said bottom having a bore, a valved nipple fitted in said bore, said plug having spaced parallel bores, one constituting a main outlet, and the other being counter-sunk and providing an air inlet, a valve casing fitted in said air inlet bore and having a seat, a valve, a spring bearing against said valve and a shoulder provided by said counter bore, whereby said valve is normally closed, and springs encircling the opposite ends of said rod and forming a cushion for said piston.

In testimony whereof I affix my signature.

LOUIS WALTER MEYER.